(12) United States Patent
Chen

(10) Patent No.: US 8,336,971 B2
(45) Date of Patent: Dec. 25, 2012

(54) ENCLOSURE OF ELECTRONIC DEVICE WITH GROOVE

(75) Inventor: Yun-Lung Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 157 days.

(21) Appl. No.: 12/903,074

(22) Filed: Oct. 12, 2010

(65) Prior Publication Data

US 2011/0273067 A1 Nov. 10, 2011

(30) Foreign Application Priority Data

May 5, 2010 (CN) .......................... 2010 1 0163270

(51) Int. Cl.
*A47B 81/00* (2006.01)
(52) U.S. Cl. ................................... 312/223.2
(58) Field of Classification Search ............... 312/223.1, 312/223.2, 263, 265.5, 265.6
See application file for complete search history.

(56) References Cited

U.S. PATENT DOCUMENTS

| | | | | | |
|---|---|---|---|---|---|
| 2,725,271 | A | * | 11/1955 | Cunningham | 312/405 |
| 4,842,351 | A | * | 6/1989 | Rock et al. | 312/263 |
| 5,491,611 | A | * | 2/1996 | Stewart et al. | 361/736 |
| 6,140,577 | A | * | 10/2000 | Rapaich et al. | 174/365 |
| 6,152,549 | A | * | 11/2000 | Goto et al. | 312/223.1 |
| 7,253,359 | B2 | * | 8/2007 | Chen et al. | 174/50 |
| 2005/0103061 | A1 | * | 5/2005 | Kim | 68/5 E |
| 2007/0284977 | A1 | * | 12/2007 | Lin et al. | 312/223.2 |
| 2009/0273260 | A1 | * | 11/2009 | Kemp | 312/223.3 |

* cited by examiner

*Primary Examiner* — James O Hansen
*Assistant Examiner* — Matthew Ing
(74) *Attorney, Agent, or Firm* — Altis Law Group, Inc.

(57) ABSTRACT

An enclosure of an electronic device includes a chassis and a cover plate. An opening is defined in the chassis. The chassis includes a top plate and a flange substantially perpendicular to the top plate. A groove is defined in the flange. The groove extends along a direction substantially parallel to a plane defined by the top plate. The cover plate covers the opening of the chassis and partially covers the groove.

11 Claims, 4 Drawing Sheets

ENCLOSURE OF ELECTRONIC DEVICE WITH GROOVE

BACKGROUND

1. Technical Field

The present disclosure relates to enclosures of electronic devices, especially to an enclosure of an electronic device with a groove for coating.

2. Description of Related Art

Surfaces of computer enclosures, such as laptop or notebook computer enclosures, should be treated to improve surface properties of the enclosure, such as enhancing appearance, corrosion resistance, and scratch resistance. Typically, in a coating process, a number of adhesive strips are used prevent coating powder or paints penetrating the enclosure through seams or other gaps. However, the adhesive strips add to the cost of manufacture.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
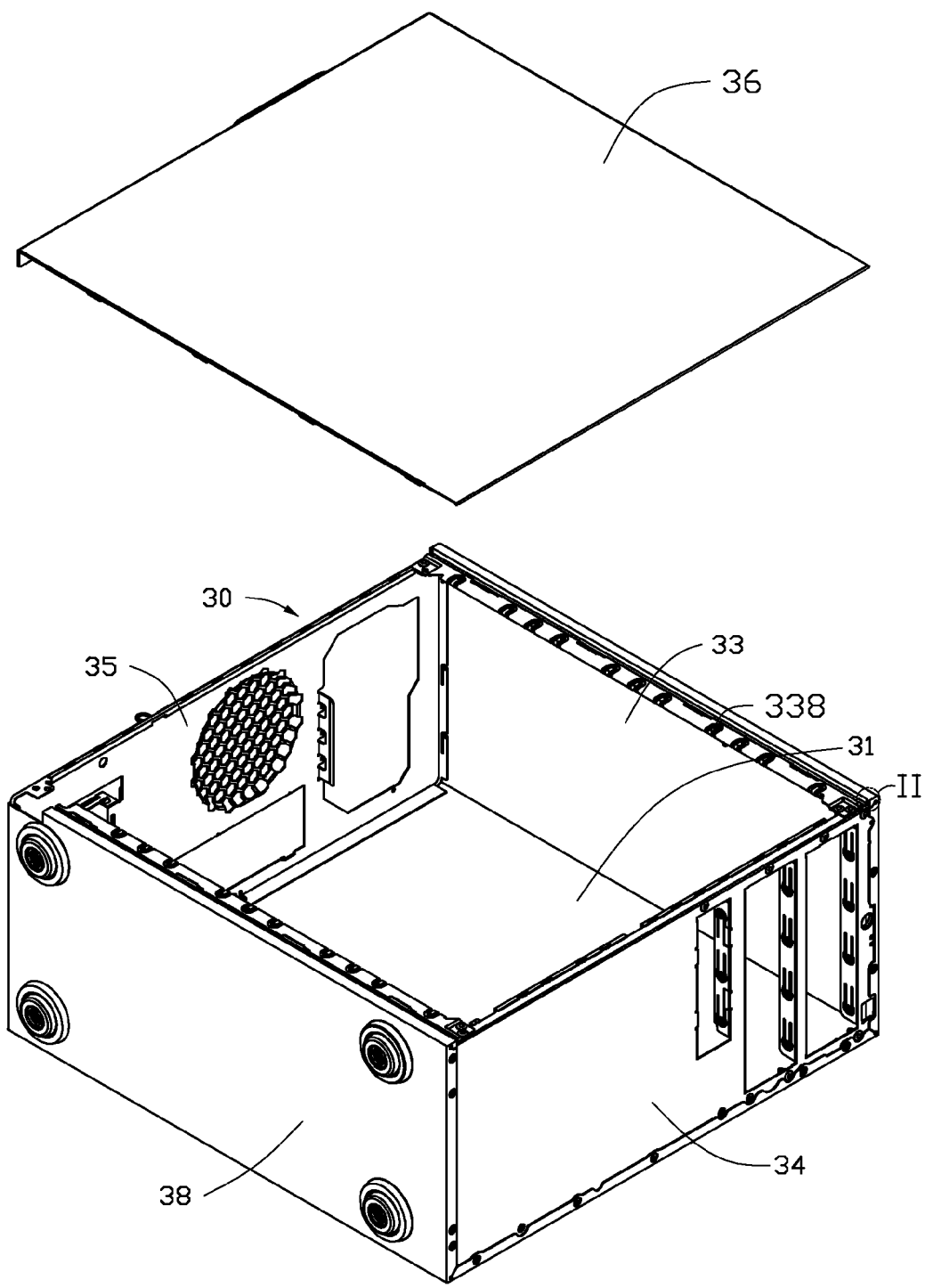
FIG. 1 is an exploded view of an enclosure of an electronic device in an embodiment.

Referring to FIG. 1, an enclosure of an electronic device 10 in accordance with an embodiment includes a chassis 30 and a cover plate 36. An opening is defined in the chassis 30 and the cover plate 36 covers the opening of the chassis 30 to enclose the chassis 30 when the cover plate 36 is mounted to the chassis 30. The chassis 30 includes a side plate 31, a top plate 33, a bottom plate 38, a front plate 34, and a rear plate 35. A flange 338 extends out substantially perpendicular to the top plate 33.

Figure 2:
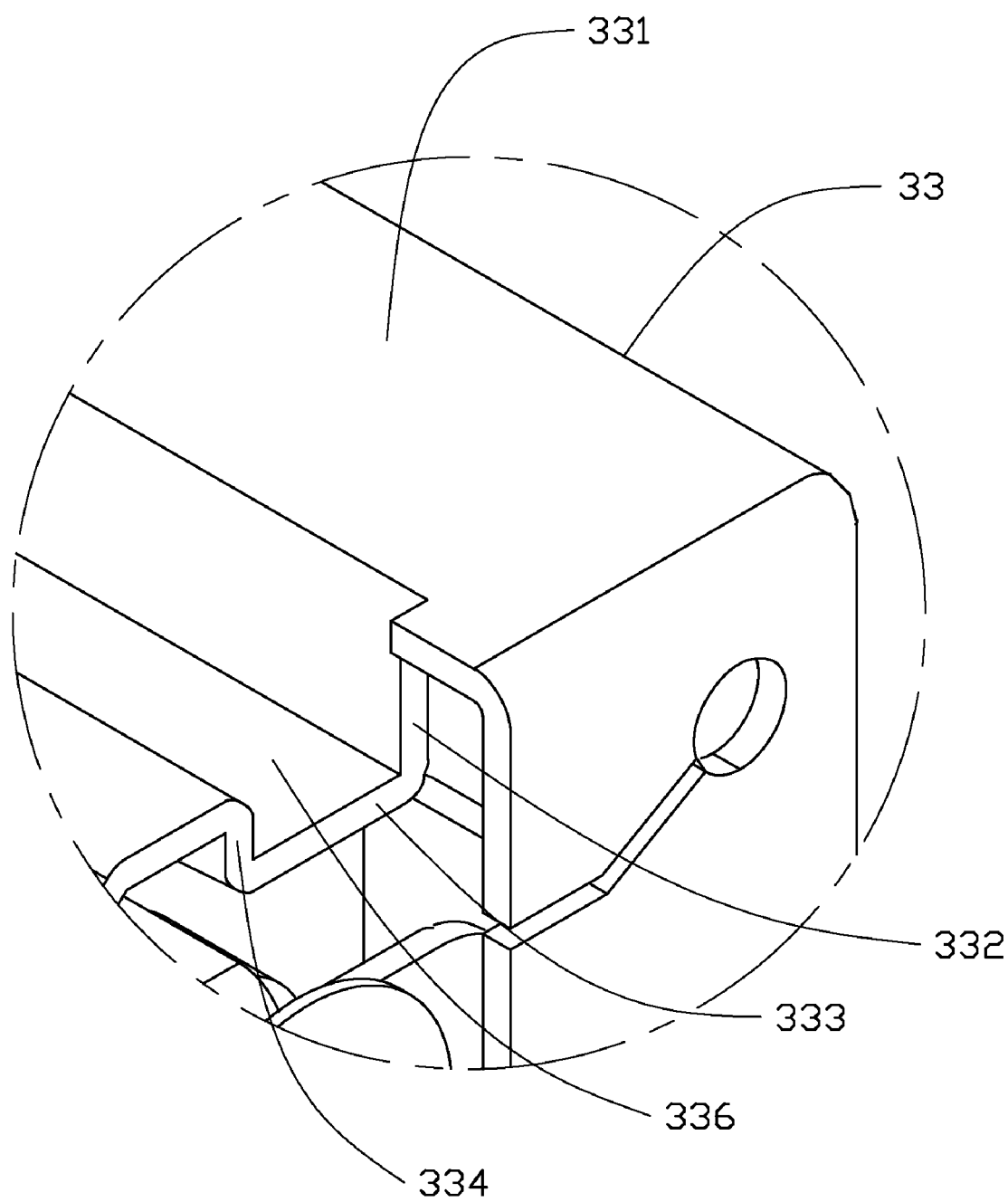
FIG. 2 is an enlarged view of an encircled portion II of FIG. 1.
Figure 3:
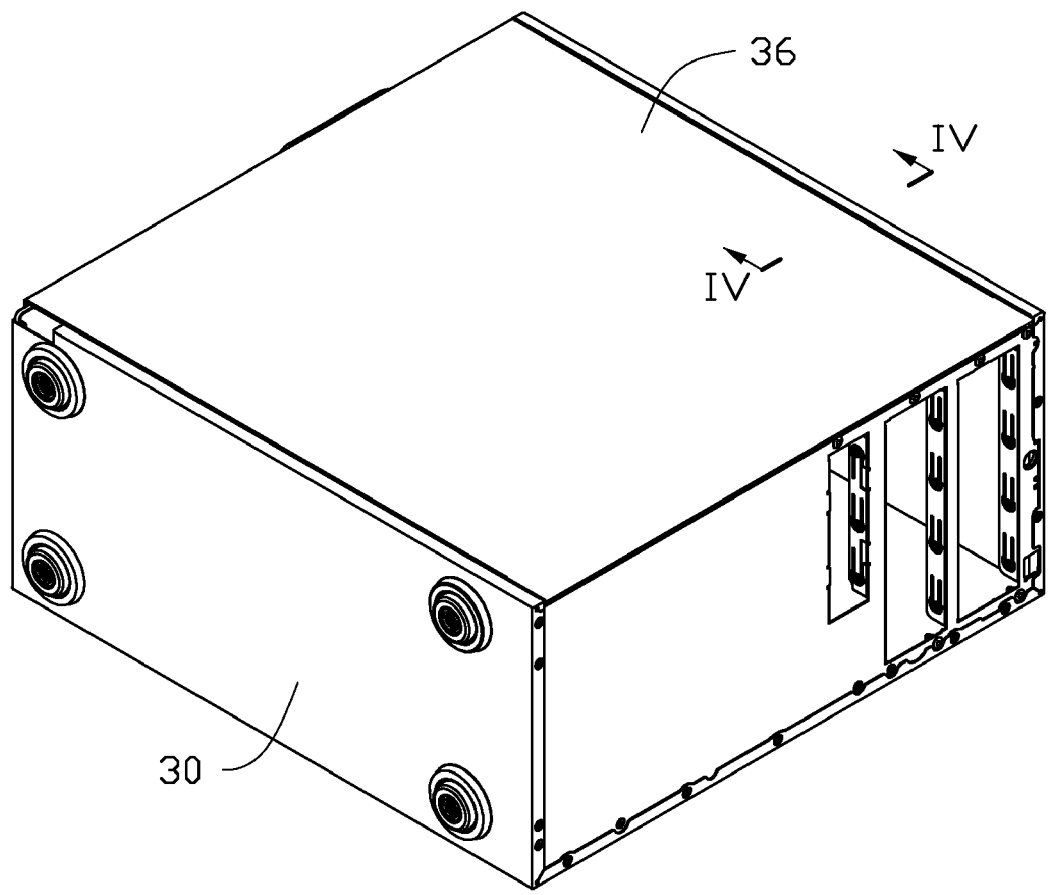
FIG. 3 is an assembled view of FIG. 1.
Figure 4:
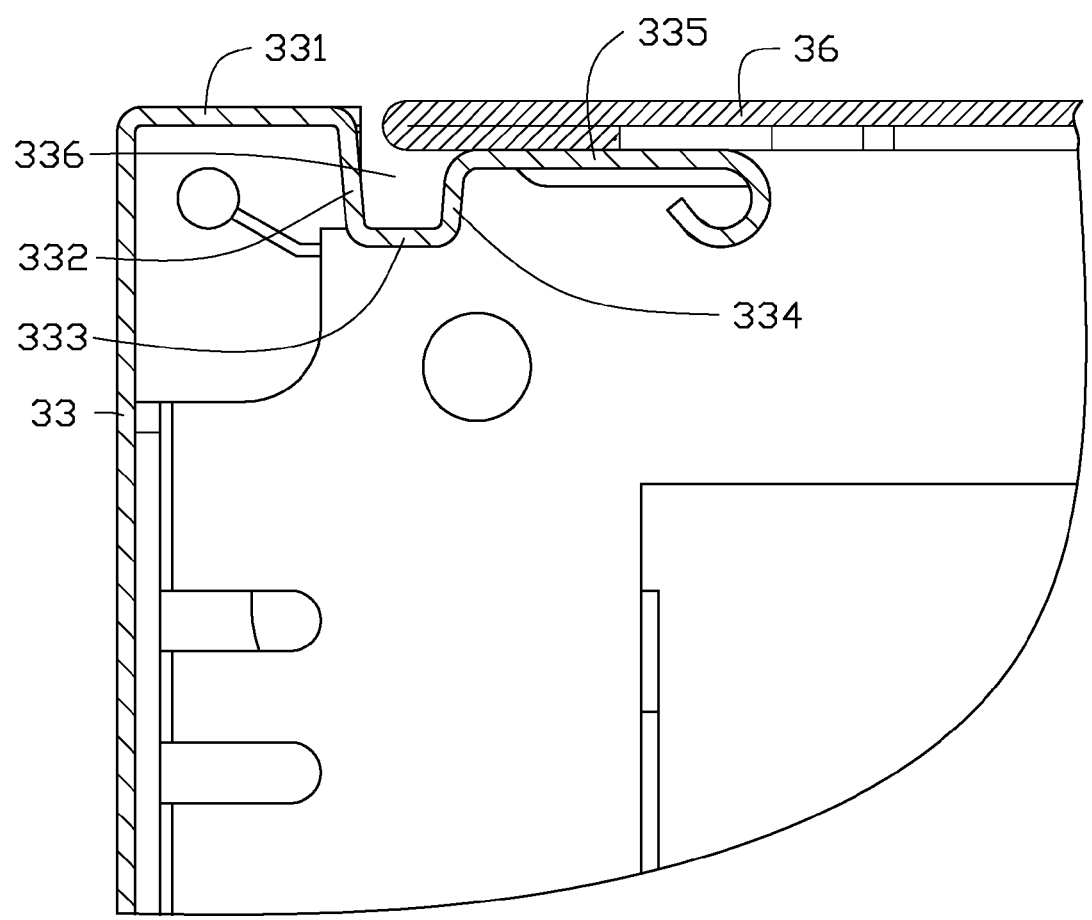
FIG. 4 is a sectional view taken along line IV-IV of FIG. 3.

Referring through FIG. 2 to FIG. 4, the flange 338 can be resiliently deformed relative to the top plate 33. The flange 338 includes an extending flange 331 and a shielding rim 335 located at a distal end of the flange 338. The extending flange 331 extends out substantially perpendicular to the top plate 33. A groove 336 is defined between the extending flange 331 and the shielding rim 335. A cross section of the groove 336 is substantially U-shaped. The groove 336 extends along a direction substantially parallel to a plane defined by the top plate 33.

The flange 338 further includes a first side groove wall 332, a bottom groove wall 333 and a second side groove wall 334. The groove 336 is cooperatively enclosed by the first side groove wall 332, the bottom groove wall 333 and the second side groove wall 334. The first side groove wall 332 perpendicularly extends from the extending flange 331. The bottom groove wall 333 is substantially perpendicular to the first side groove wall 332 and the second side groove wall 334. The shielding rim 335 is connected to the second side groove wall 334.

In one embodiment, the first side groove wall 332 is about 3 millimeters high. The bottom groove wall 333 is about 3 millimeters wide. The second side groove wall 334 is lower than the first side groove wall 332.

During assembling of the enclosure, the cover plate 36 is mounted to the chassis 30 and covers the opening of the chassis 30. The groove 336 is partially covered by the cover plate 36. That is, a gap is left between the cover plate 36 and the extending flange 331, and the gap is in communication with the groove 336. In one embodiment, a width of the gap is about 0.7 millimeters. The cover plate 36 and the extending flange 331 are located in a same plane. The shielding rim 335 abuts an inner surface of the cover plate 36 for shielding electro-magnetic interference from electronic components (not shown) inside the enclosure.

When the enclosure is coated with material, such as varnish, the material is painted on the outer surface of the enclosure, and little material may spread into the groove 336 through the gap left between the cover plate 36 and the extending flange 331. The material is finally solidified on the enclosure, such as by baking.

The gap is defined away from the shielding rim 335 and a guiding direction of the covering material is perpendicular to the shielding rim 335. The groove 336 can effectively prevent coating material from penetrating between the cover plate 36 and the shielding rim 335.

The groove 336 can also catch excess material from the painting process. Therefore, the coating of the enclosure may be smooth at a connecting portion of the cover plate 36 and the chassis 30.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An enclosure of an electronic device comprising:
    a chassis, an opening defined in the chassis, the chassis comprising a top plate and a flange substantially perpendicular to the top plate, a groove defined in the flange, the groove extending along a first direction substantially parallel to a plane defined by the top plate; and
    a cover plate covering the opening of the chassis, the cover plate extending along a second direction that is substantially perpendicular to the top plate, and the cover plate partially covering an inlet of the groove;
    wherein a cross section of the groove is substantially U-shaped, the flange comprises a shielding rim at a distal end thereof, and an extending flange is substantially perpendicular to the top plate; and the groove is defined between the extending flange and the shielding rim, and the shielding rim abuts against an inner surface of the cover plate for shielding against electro-magnetic interference.

2. The enclosure of claim 1, wherein the cover plate and the extending flange are located in a same plane.

3. The enclosure of claim 1, wherein a gap is defined between the cover plate and the extending flange, the gap is in communication with the groove, and a width of the gap is about 0.7 millimeters.

4. The enclosure of claim 1, wherein the flange further comprises a first side groove wall connected to the extending flange, a bottom groove wall and a second side groove wall; the groove is defined by the first side groove wall, the bottom groove wall and the second side groove wall; and the first side groove wall is about 3 millimeters high.

5. The enclosure of claim 4, wherein the bottom groove wall is about 3 millimeters wide.

6. The enclosure of claim 4, wherein the bottom groove wall is about 3 millimeters wide.

7. The enclosure of claim 1, wherein the cover plate is located on top of the shielding rim.

8. An enclosure of an electronic device comprising:
    a chassis, the chassis comprising a top plate and a flange substantially perpendicular to the top plate, a groove defined in the flange, the groove extending along a direction substantially parallel to a plane defined by the top plate; and
    a cover plate mounted to the chassis and located perpendicular to the top plate;
    wherein a gap is defined between a free end of the cover plate and the chassis at an inlet of the groove; a cross section of the groove is substantially U-shaped, the flange comprises a shielding rim at a distal end thereof, and an extending flange substantially perpendicular to the top plate; the groove is defined between the extending flange and the shielding rim; and the cover plate and the extending flange are located in a same plane.

9. The enclosure of claim 8, wherein the shielding rim abuts an inner surface of the cover plate for shielding electromagnetic interference.

10. The enclosure of claim 8, wherein a width of the gap is about 0.7 millimeters.

11. The enclosure of claim 8, wherein the flange further comprises a first side groove wall connected to the extending flange, a bottom groove wall and a second side groove wall; the groove is defined by the first side groove wall, the bottom groove wall and the second side groove wall; and the first side groove wall is about 3 millimeters high.

* * * * *